United States Patent [19]

Polder, Jr.

[11] Patent Number: 4,669,769

[45] Date of Patent: Jun. 2, 1987

[54] PICK UP DEVICE

[76] Inventor: John Polder, Jr., 1951 47th St. #134, San Diego, Calif. 92102

[21] Appl. No.: 834,959

[22] Filed: Feb. 28, 1986

[51] Int. Cl.$^4$ .......................... A47F 13/06; B25J 1/00
[52] U.S. Cl. .................................................. 294/19.1
[58] Field of Search ................ 294/19.1, 11, 22, 50.5, 294/50.6, 50.8, 50.9, 100, 104, 106, 110.1, 110.2, 115

[56] References Cited

U.S. PATENT DOCUMENTS

| 2,613,100 | 10/1952 | Casey, Jr. | 294/19.1 |
| 4,039,216 | 8/1977 | Soos | 294/19.1 |
| 4,398,759 | 8/1983 | Manola | 294/19.1 |

Primary Examiner—James B. Marbert
Attorney, Agent, or Firm—Charles C. Logan, II

[57] ABSTRACT

A pick up device having an elongated tubular member whose opposite ends are attached respectively to a handgrip assembly and a dual jaw member gripping assembly. The handgrip assembly has a trigger which is attached to a rod member that passes through the interior of the elongated tubular member and which has its opposite ends attached to the dual jaw member gripping assembly. The dual jaw member gripping assembly has a pair of elongated jaw members each having a front leg portion, a rear leg portion, and a pivot pin aperture intermediate the front and rear leg portions. It also has a top plate and a bottom plate. The bottom plate has an upstanding hub formed at the opposite corners of its front portion. The jaw members fit over the hubs and are held in place by self-tapping screws which thread into the hubs extending upwardly from the bottom plate. Shoulders on the hubs position the top plate at the correct spacing from the bottom plate. The dual jaw member gripping assembly further has a clevis with vertically spaced top and bottom walls interconnected at their forward end by a pressure wall. The rear leg portions of the respective jaw members are captured within the clevis and as the clevis is drawn rearwardly by the rod member connected to the trigger, the pressure wall draws against the tips of the jaw members causing them to pivot toward each other as the clevis travels rearwardly. As the trigger is released, a spring located in back of the clevis pushes it forwardly causing the jaw members to pivot away from each other at the point of contact with the axial travel stop member.

7 Claims, 6 Drawing Figures

PICK UP DEVICE

BACKGROUND OF THE INVENTION

The invention generally relates to hand operated devices for retreiving articles out of normal reach, and more specifically to a portable pick up device.

The device is especially designed for the convenience of householders and others who may have occasion to retreive articles from the floor or ground or from high places normally out of reach. The device is especially useful for picking up trash or other litter on the ground or inaccesible locations.

A number of pick up devices have been suggested in the prior art. See, for example, U.S. Pat. Nos. 3,194,597, 3,785,689, 4,037,868, 4,398,759, and 4,441,746. The structure of these devices have not been entirely satisfactory.

It is an object of the invention to provide a novel pick up device having a streamlined outer appearance.

It is also an object of the invention to provide a novel pick up device that has a convenient handgrip portion with a trigger actuating mechanism.

It is another object of the invention to provide a novel pick up device having a unique structure for its jaw member gripping assembly.

It is a further object of the invention to provide a novel pick up device that is economical to manufacture and market.

It is an additional object of the invention to provide a novel pick up device that can be easily and quickly disassembled for repairs and reassembled as quickly.

SUMMARY OF THE INVENTION

Applicant's novel pick up device has an elongated tubular member whose opposite ends are respectively connected to a handgrip assembly and a dual jaw member gripping assembly.

The handgrip is formed from a left hand and a right hand grip portion preferably formed of plastic material and secured together by self-tapping screws. A trigger is pivotally attached within the hand assembly and it is secured to the rear end of a rod member passing through the elongated tubular member.

The front end of the rod member has its tip captured in a clevis that sets in a compartment that is part of the extended portion of the bottom plate. The extended portions of the top and bottom plates are inserted into the front end of the tubular member. The clevis has a top wall and a bottom wall that are vertically separated and which have a pressure wall connecting their front ends. The clevis sets between the top plate and the bottom plate of the dual jaw member gripping assembly.

The triangularly shaped portion of the bottom plate has hubs extending upwardly from each of its front corners that align with apertures in the top plate. The apertures of the jaw members fit over the hubs of the bottom plate. The apertures are located intermediate the front leg portion and the rear leg portion of the jaw members. The rear leg portions of the two jaw members extend inwardly into the open space between the top wall and the bottom wall of the clevis immediately to the rear of the pressure wall and in front of the axial travel stop. When the trigger is pulled it, it draws the rod member rearwardly and since it is attached to the clevis, the pressure wall of the clevis will draw against the rear leg portions of the respective jaw members. Continued travel of the clevis rearwardly causes the jaw members to pivot about their respective pivot points and causes the tip portions of the jaw members to be brought together. When the trigger is released, the spring, which has been compressed by the rearward pull of the trigger, expands and pushes the clevis forward which opens the jaw members at the point of contact with the axial travel stop. The jaw members are so constructed that their horizontal portions are one above the other, which allows their rearward portions to overlap when they meet in the clevis.

DESCRIPTION OF THE PREFERRED EMBODIMENT

Figure 1:
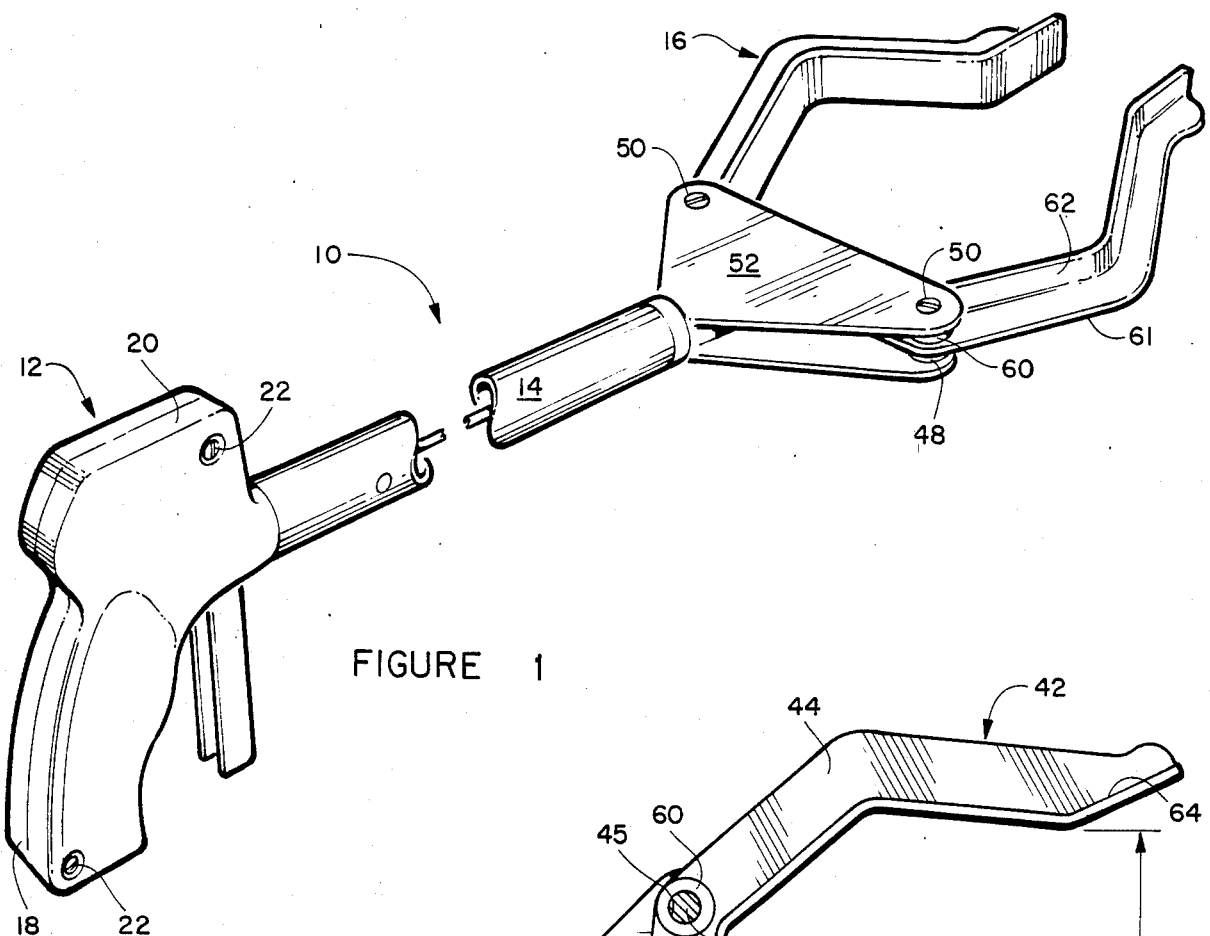
FIG. 1 is a perspective view of applicant's novel pick up device.
Figure 2:
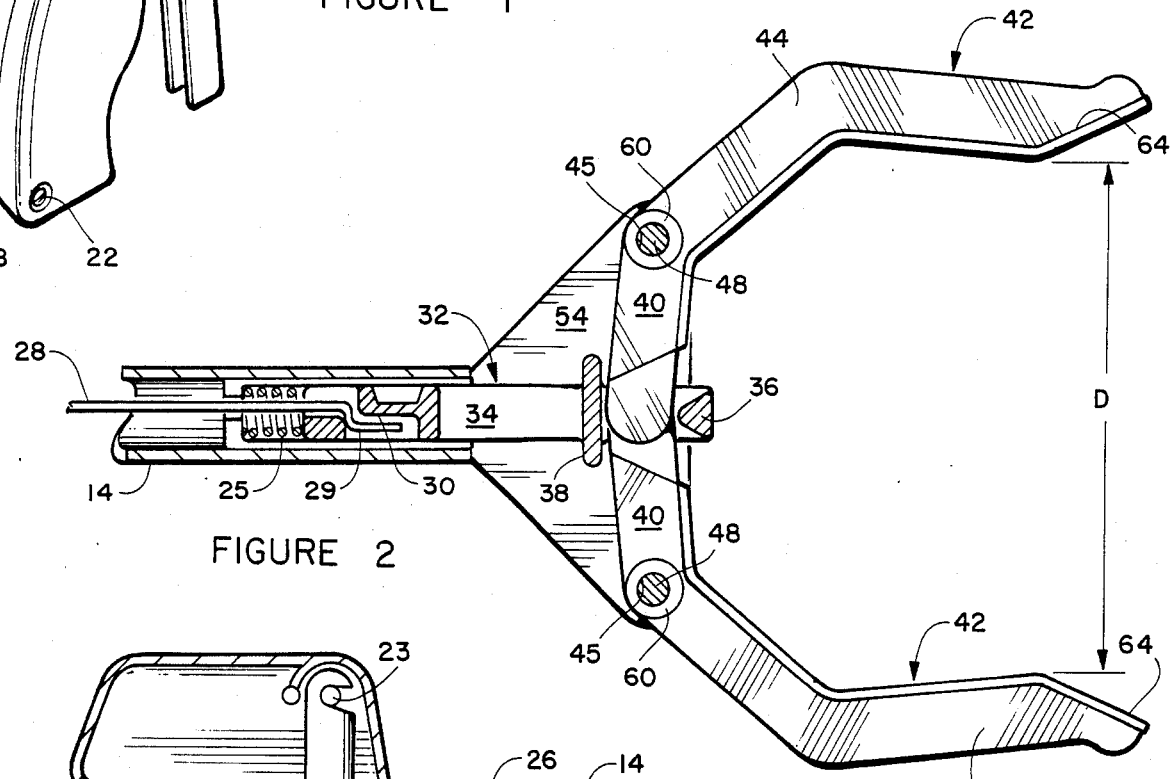
FIG. 2 is a top plan view of the forward end of the pick up device with portions shown in cross section.
Figure 3:
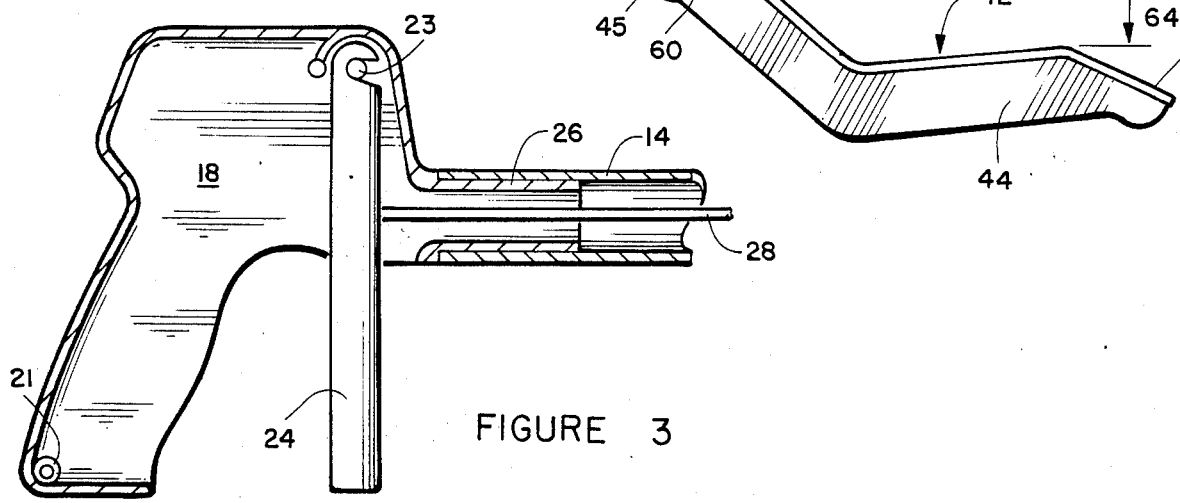
FIG. 3 is a side elevation view of the handgrip assembly with portions illustrated in cross section.
Figure 4:
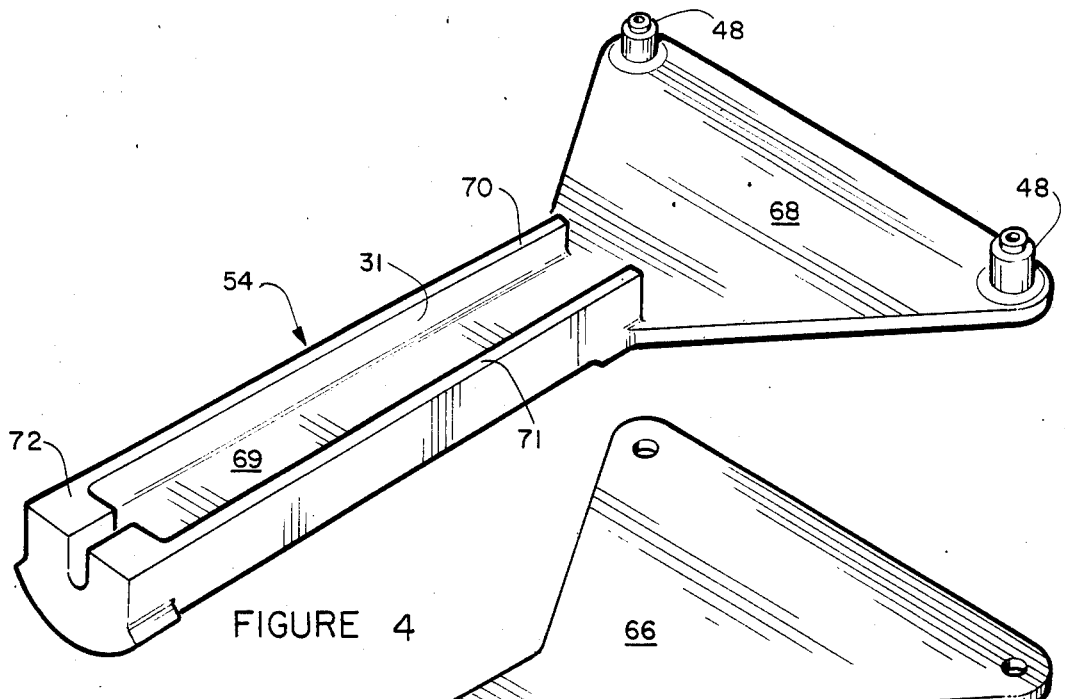
FIG. 4 is a perspective view of the top plate.
Figure 5:
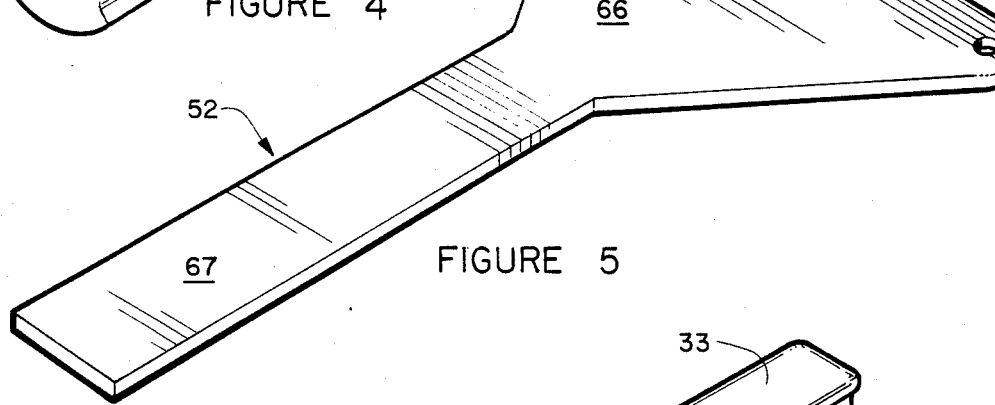
FIG. 5 is a perspective view of the bottom plate.
Figure 6:
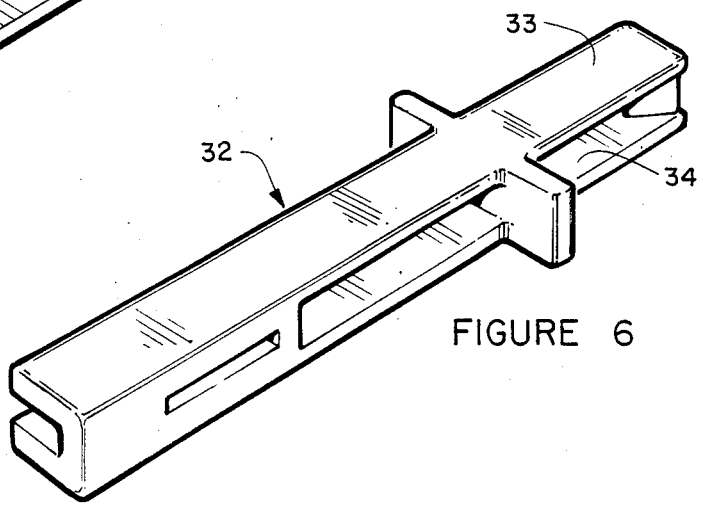
FIG. 6 is a perspective view of the clevis.

The novel pick up device is generally designated numeral 10 and will now be described by referring to FIGS. 1-6 of the drawings.

Pick up 10 has a handgrip assembly 12, an elongated tubular member 14, and a dual jaw member gripping assembly 16.

The handgrip assembly 12 has a left hand grip portion 18 and a right hand grip portion 20 and they are secured together by self-tapping screws 22 at hubs 21 and 23. It has a trigger 24 whose top end is captured in the housing and which pivots around hub 23 built into the left half of the handgrip assembly. The front end of the handgrip assembly has a reduced diameter neck portion 26 that telescopically mates with the rear end of elongated tubular member 14 and is held in place by friction or by glue.

An elongated rod member 28 extends throughout the length of the interior of tubular member 14. It has its rear end secured to trigger 24. Its front end has a tip portion 29 that is captured within the receptacle 30 of the clevis 32 which in turn sits in the compartment 31 formed in the extended portion of bottom plate 54. The top and bottom plates are inserted into the front end of tubular member 14.

Clevis 32 has a top wall 33 and a bottom wall 34 that are vertically spaced from each other and which are connected at their front ends by a pressure wall 36. A compression spring 25 sits between the rear wall of the clevis receptacle 30 and the rear wall of the bottom plate compartment 31. An axial travel stop member 38 also connects the top wall 33 and the bottom wall 34 and forms an opening with pressure wall 36 for receiving the rear leg portions 40 of the jaw members 42.

Each jaw member is contructed so as to have a boss 60, a horizontal outside edge 61 and a vertical inside edge 62, and a pivot point aperture 45. The jaw members, respectively fit over the hubs 48 of the bottom plate 54 and are held in place by the top plate 52 and the self-tapping screws which thread into the hubs. Jaw members 42 also have tip portions 64. Top plate 52 has a front trianular portion 66 and a tail portion 67. Bottom plate 54 has a front triagular portion 68 and a tail portion 69. Side walls 70 and 71 along with rear wall 72 form the bottom plate compartment 31.

What is claimed is:

1. A pick up device comprising:
    a handgrip assembly having a trigger;
    a dual jaw member gripping assembly comprising a pair of elongated jaw members each having a front leg portion, a rear leg portion, and a pivot pin aperture intermediate said front and rear leg portions, a bottom plate having a front triangular portion with an elongated tail portion extending rearwardly, said bottom plate having built in hubs located adjacent the forward end of said front triangular portion that align themselves with the apertures of said jaw members, side walls extend upwardly from the lateral edges of said tail portion and these side walls along with a rear wall extending upwardly from the rear end of said tail portion form a compartment for receiving an elongated clevis that is slidable longitudinally back and forth within said compartment when said trigger is squeezed and released, and a top plate having a front triangular portion with an elongated tail portion extending rearwardly, said jaw members being able to pivot about these hubs to touch each at the tips of their front leg portions;
    an elongated tubular member having its one end connected to said handgrip assembly and its other end connected to said dual jaw member gripping assembly;
    an elongated rod member passing through the interior of said tubular member having its one end connected to said trigger and its opposite end connected to means for pivoting said jaw members about their respective hubs to close said jaw members about an object; and
    said means for pivoting said jaw members comprises a clevis which is received inside said compartment formed in said bottom plate and this structure in turn is received in one end of said tubular sleeve and said clevis has a receptacle for receiving the front tip portion of said rod member.

2. A pick up device as recited in claim 1 wherein said hand grip assembly is formed of a left hand portion and a right half hand grip portion that mate together.

3. A pick up device as recited in claim 1 wherein the front leg portion of said jaw members have an obtuse angular orientation to said rear leg portion.

4. A pick up device as recited in claim 1 wherein said front leg portions have a vertically extending flange along their inner edge.

5. A pick up device as recited in claim 1 wherein said clevis has vertically spaced top and bottom walls interconnected at their forward end by a pressure wall that causes the tips of said jaw members to pivot toward each other as the clevis travels rearwardly.

6. A pick up device as recited in claim 1 wherein said clevis has means for limiting its rearward axial travel.

7. A pick up device as recited in claim 1 further comprising a spring which abuts against the rear of said clevis to cause the tips of the jaw members to move away from each other as the clevis travels forward.

* * * * *